United States Patent
Dostal et al.

[11] 3,879,955
[45] Apr. 29, 1975

[54] DUCTLESS AIR DISTRIBUTION SYSTEM

[75] Inventors: Donald J. Dostal, Chicago; Ronald W. Dostal, Hinsdale, both of Ill.

[73] Assignee: Dostal Enterprises, Inc., Chicago, Ill.

[22] Filed: Apr. 4, 1974

[21] Appl. No.: 457,990

[52] U.S. Cl. ............ 62/89; 62/97; 62/407; 62/413; 62/414; 62/419; 98/9; 98/20
[51] Int. Cl. .............................. F25d 17/06
[58] Field of Search ........ 62/89, 97, 407, 414, 413, 62/415, 416, 419, 418; 98/9, 20

[56] References Cited
UNITED STATES PATENTS

| | | | |
|---|---|---|---|
| 2,731,807 | 1/1956 | Allyne | 62/89 |
| 2,780,923 | 2/1957 | Jones | 62/78 |
| 3,180,403 | 4/1965 | Breen | 62/97 |
| 3,786,652 | 1/1974 | Bolynn | 62/89 |
| 3,792,595 | 2/1974 | Willis | 62/414 |
| 3,805,544 | 4/1974 | Stromblad | 62/413 |

*Primary Examiner*—William J. Wye
*Attorney, Agent, or Firm*—Alter and Weiss

[57] ABSTRACT

A device which acting in combination with the air conditioning unit of refrigerated vehicles propels the cooled air along one surface of the vehicle for circulation throughout the vehicle's interior. A portion of the device's base is slanted downward to form an inlet orifice which is larger than the exit orifice. Vanes interposing the top surface and base act in conjunction with flared side walls to direct the air flow.

9 Claims, 9 Drawing Figures

DUCTLESS AIR DISTRIBUTION SYSTEM

This invention relates to a ductless air distribution system for refrigerated vehicles, and more particularly, to one in which a rigid device acting in combination with the system is capable of circulating the cooled air along one surface of the vehicle without any supporting rigid or pliable duct work.

Heretofore, cooled air has been distributed throughout refrigerated vehicles by use of ducts integrally connected to the air conditioning unit and extending to various points within the vehicle. Not only does such duct work occupy valuable space and obstruct the movement of goods; but, moreover, it is commonly constructed of canvass to which dirt and dust adhere. Therefore, one must incur the continuous expense of cleaning the canvass duct work if sanitary conditions within the vehicle are to be maintained.

There are other disadvantages inherent in this conventional type of distribution system. One has been that the air conditioning unit itself is the only source of power to propel the cooled air throughout the duct work. To adequately cool the vehicle a more powerful and expensive unit must be used than that which could be employed if an independent source of power was integrated into the system.

Another disadvantage is that the air from within the vehicle cannot be mixed with the cooled air while inside the canvass ducts. This is due to the structure of a conventional cylindrical duct.

Futher, since the ducts are tightly mounted to the air conditioning unit's evaporator, mixing of outside air with cooled air is precluded.

It is therefore the primary object of this invention to provide a new and improved device for the circulation of air cooled in the air conditioning unit of refrigerated vehicles which is economical to install and maintain. More particularly, an object is to provide a device which propels the cooled air along one surface of the vehicle for circulation throughout the interior of the vehicle without the use of supporting duct work. In this connection the object is to provide a device which increases the velocity of air which is received and discharges the air in directional streams.

Yet another object is to provide a device which mixes the cooled air with air from outside the device before the air is discharged and circulated.

In keeping with one aspect of the invention, the foregoing and other objects are accomplished by providing a device which is easily and inexpensively installed for use with the conventional air conditioning distribution system of refrigerated vehicles. The device is positioned so that the air is first propelled along one surface of the vehicle and then circulated throughout the entire interior. Movement of air through the device creates a Venturi action which enables a mixing of air within the device and an increase in the velocity upon discharge. The device's rigid construction with a smooth exterior finish facilitates a cleaning, thereby minimizing the cost of maintenance.

The above-mentioned and other features and objects of this invention and the manner of obtaining them will become more apparent, and the invention itself will be best understood by reference to the following description of an embodiment of the invention taken in conjunction with the accompanying drawings, in which.

Figure 1:
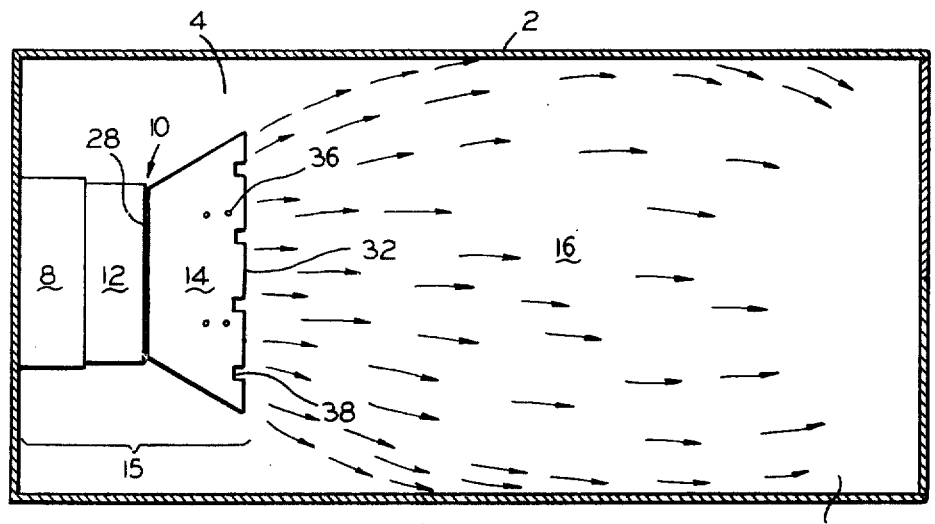
FIG. 1 is a top view of a refrigerated vehicle with a conventional air conditioning unit acting in combination with the inventive device.
Figure 2:
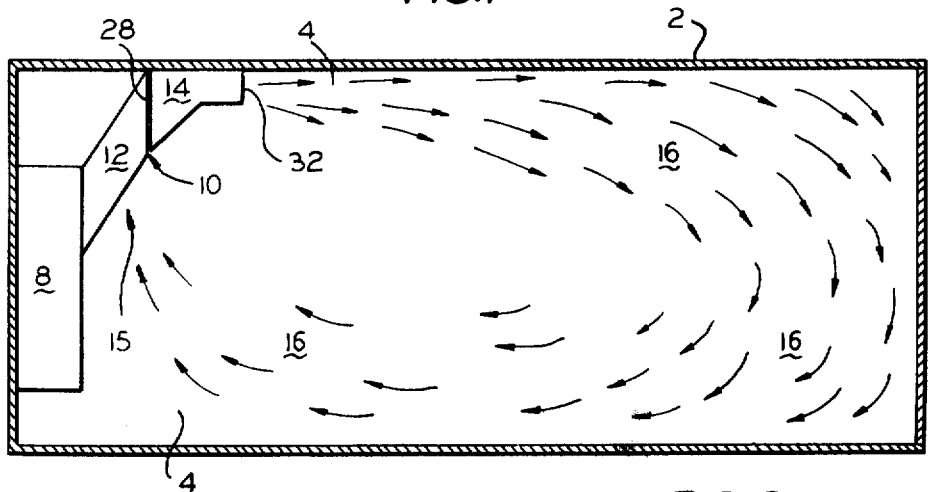
FIG. 2 is a side view of that which is shown in FIG. 1.

FIGS. 1 and 2 show a top and side view of the inventive device used in combination with a conventional air conditioning unit of a refrigerated vehicle. In greater detail, air distribution unit 15 of refrigerated vehicle 2 is composed of air conditioning unit 8, plenum 12, and inventive device 14 acting in combination.

Air conditioning unit 8 propels the cooled air to the plenum 12 into device 14. There it mixes with air from vehicle interior 4 which has been suctioned into device 14 through air space 10 and the inlet orifice 28 before being discharged and circulated as represented at the exit orifice 32 by air flow pattern 16.

Figure 4:
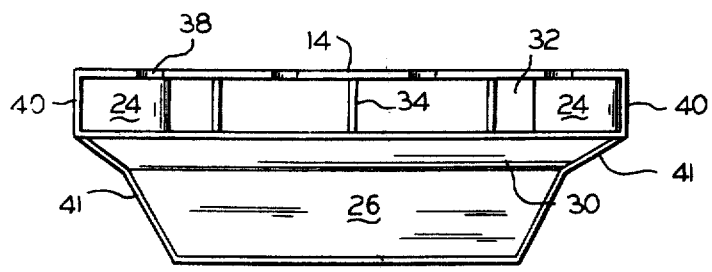
FIG. 4 is a front view of the inventive device.
Figure 3:
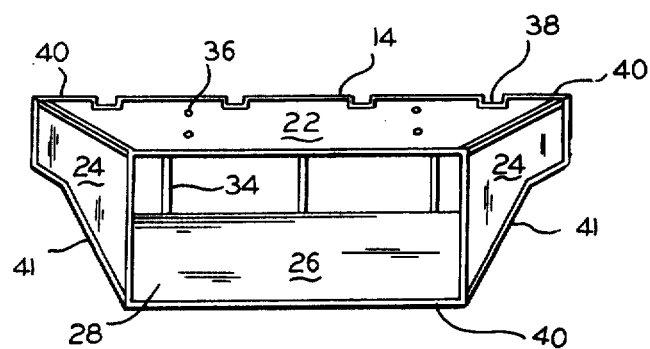
FIG. 3 is a rear view of the inventive device.

The design of device 14 as shown in FIGS. 3 and 4 enables the mixing to occur. Top surface 22 and flared side walls 24 combine with slanted base portion 26 to define inlet orifice 28 (rear view, FIG. 3) and with flat base portion 30 to define exit orifice 32 (front view, FIG. 4). Since inlet orifice 28 is larger than exit orifice 32, pressure drops within device 14 and the velocity of the cooled air increases when it is forced to exit through a smaller orifice than that through which it entered. Venturi action is thereby created within device 14 enabling the mixing of air since pressure is equalized by the intake of air through air space 10. Further, the cooled air mixture is discharged from device 14 at a greater velocity than that at which it entered, thereby increasing the efficiency of air distribution unit 15.

FIGS. 3 and 4 also show a plurality of vanes 34 which are interposed between flat base portion 30 and top surface 22 thereby partitioning exit orifice 32. Acting in combination with flared side walls 24, vanes 34 direct the cooled air mixture along the top surface of vehicle interior 4 thereby enabling the air to circulate along air flow pattern 16.

Figure 5:
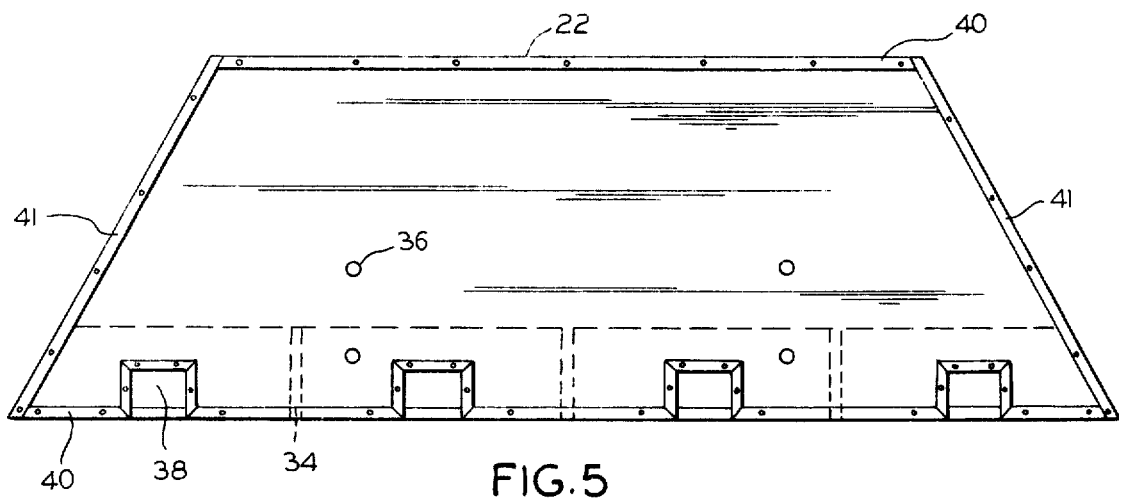
FIG. 5 is a top view of the inventive device.

Other features of device 14 which facilitate its use in the refrigerated vehicles, are shown in FIG. 5. Top surface 22 provides for both holes 36 to engage mounting means and apertures 38. The apertures 38 serve as passageways for various pipes of conventional piping systems. Placement of these features can easily be varied as the design of the vehicle dictates.

Figure 6:
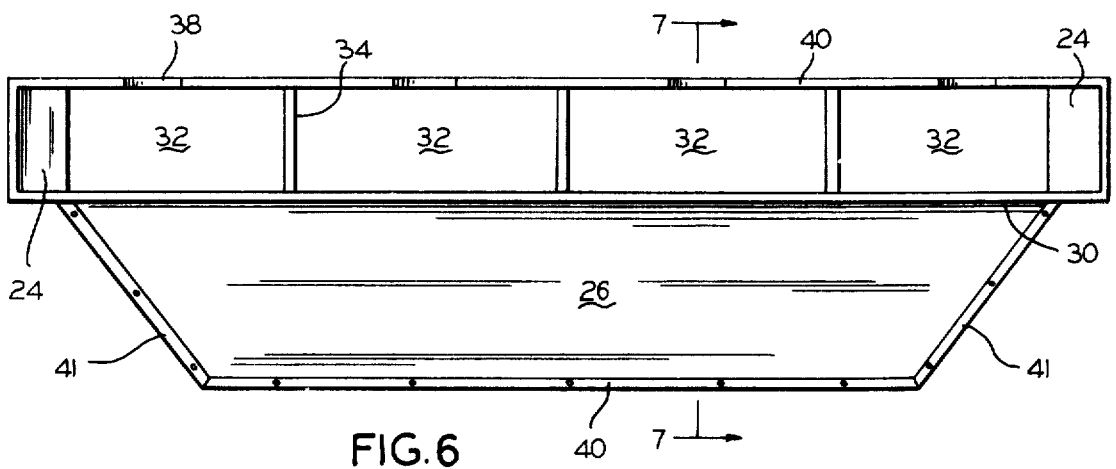
FIG. 6 is a front view of the inventive device through which a cross-section is taken on a plane passing through line 7—7.
Figure 7:
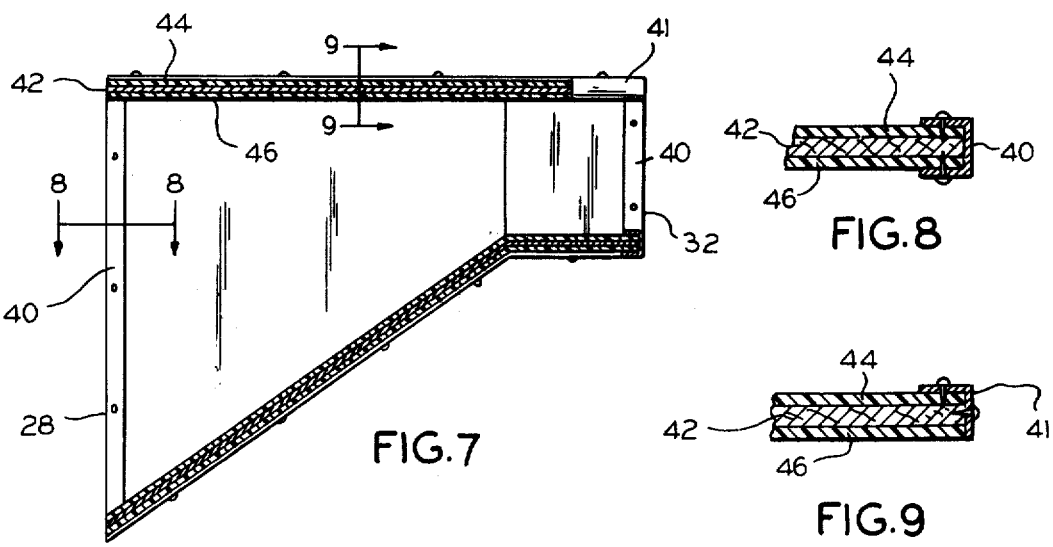
FIG. 7 is a cross-sectional view of the inventive device taken on a plane passing through line 7—7 of FIG. 6 looking in the direction of the arrows.
Figure 8:
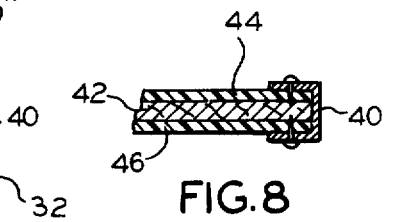
FIG. 8 is a cross-sectional view of the inventive device taken on a plane passing through line 8—8 of FIG. 7 where the rim of the device is a channel looking in the direction of the arrows.
Figure 9:
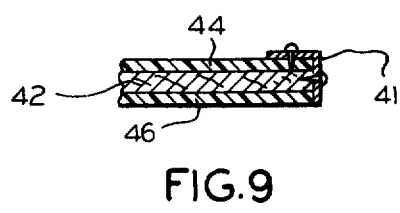
FIG. 9 is a cross-sectional view of the inventive device taken on a plane passing through line 9—9 of FIG. 7 where the rim of the device is an angle looking in the direction of the arrows.

The construction of device 14 is shown in FIG. 7 which is a cross-section taken on the plane passing through line 7—7 of FIG. 6. Plywood 42 is a strong and rigid core which is sandwiched between sheets of fiberglass 44 and 46. The fiberglass outerfacing enhances the rigidity and facilitates the cleaning of device 14. The entire device is then rimmed with channels 40 (FIG. 8) and angles 41 (FIG. 9) of a material such as metal.

While the principles of the invention have been described above in connection with the specific apparatus and applications, it is to be understood that this description is made only by way of example and therefore it should be understood that modifications may be made without departing from the scope of the invention.

We claim:

1. A device for circulating air cooled in an air conditioning unit of a refrigerated vehicle that is adapted for cooperation with one surface of the vehicle to propel the air along that one surface for communication with the entire interior of the vehicle comprising:
   a housing adapted for mounting in the vehicle having an inlet orifice proximately located to cooperate with said air conditioning unit; and
   an exit orifice with a plurality of vanes which cooperate with said housing to distribute the air along one surface;
   whereby cooled air flowing along said surface is caused to circulate through all portions of the vehicle's interior without the aid of a duct.

2. A device as defined in claim 1, having a pair of flared sidewalls that cooperate with said vanes to propel the air along the one surface.

3. A device as defined in claim 1, wherein said inlet orifice is larger than said exit orifice whereby movement of air through said device causes a Venturi action thereby increasing the air's velocity while simultaneously creating a suction effect.

4. A device as defined in claim 3, wherein the location of said device creates an air space whereby air from the vehicle's interior is suctioned into said device and mixed with the cooled air.

5. A device as defined in claim 3, wherein a base is graduated so as to cooperate with said housing to define said inlet orifice which is larger than said exit orifice.

6. A device as defined in claim 5, therein the base consists of a flat portion cooperating with said housing to define said exit orifice and a slanted portion cooperating with said housing to define said inlet orifice.

7. A device as defined in claim 1, having a rigid construction with a smooth outer surface which comprises plywood sandwiched between fiberglass and the edges thereof have a metal covering associated therewith.

8. A process for circulating air cooled in an air conditioning unit of a refrigerated vehicle by adapting a device for cooperating with one surface of the vehicle so as to propel the air along that one surface for communication with the entire interior of the vehicle comprising the steps of:
   receiving the air through an inlet orifice of said device;
   propelling the air through an exit orifice of said device;
   dropping the pressure within said device by forcing the air to exit through the exit orifice that is smaller than the inlet orifice to increase the air's velocity;
   directing without enclosing the air with the increased velocity along one surface of said vehicle after the air leaves the exit orifice;
   whereby the cooled air flowing along said surface is caused to circulate through all portions of the vehicle's interior without the aid of a duct.

9. A process as defined in claim 8, wherein the cooled air is mixed with air from outside said device before being discharged from said device comprising:
   propelling the air through an air space prior to reception through said inlet orifice;
   suctioning air into said device through said air space thereby mixing it with the cooled air;
   whereby air from outside said device is mixed and recirculated with air cooled in said air conditioning unit and discharged at a greater velocity than that at which it entered.

* * * * *